Jan. 1, 1924
W. DE F. CROWELL
CLEAR VISION WINDSHIELD
Filed March 16, 1920
1,479,375
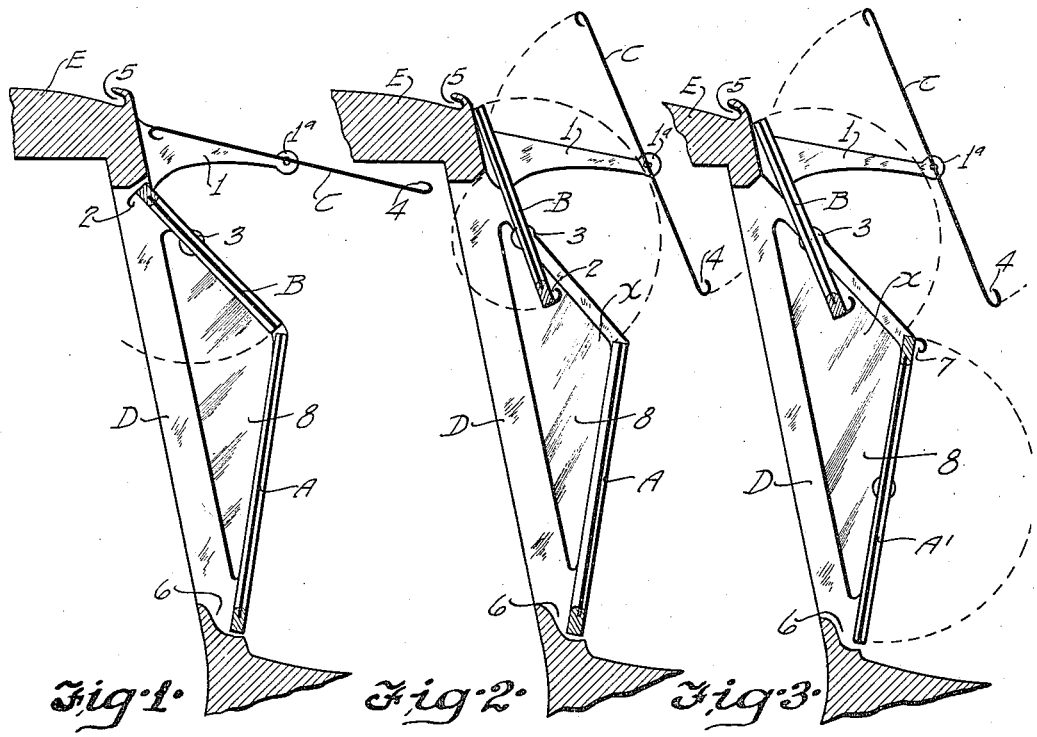
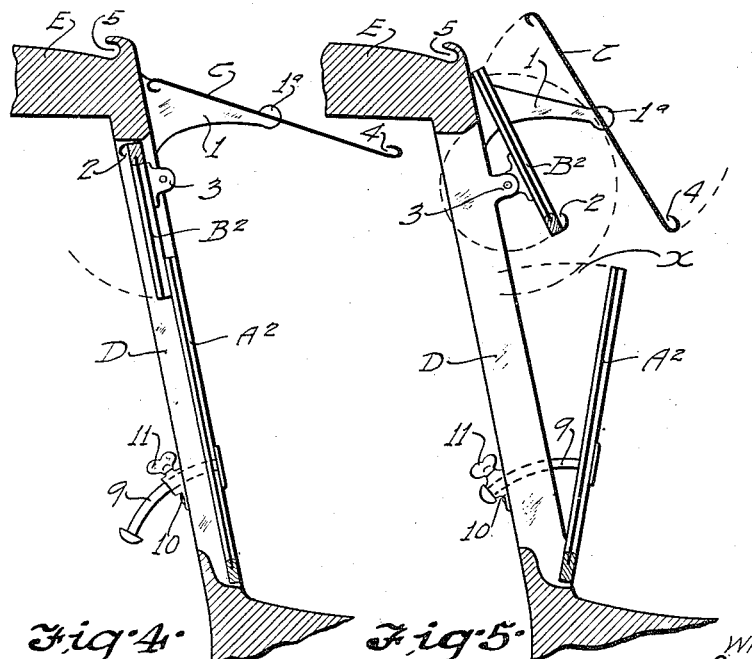
INVENTOR
William de F. Crowell.
By Bakewell & Church
ATTORNEYS Patented Jan. 1, 1924.

1,479,375

UNITED STATES PATENT OFFICE.

WILLIAM DE FORREST CROWELL, OF ST. LOUIS, MISSOURI.

CLEAR-VISION WINDSHIELD.

Application filed March 16, 1920. Serial No. 366,246.

*To all whom it may concern:*

Be it known that I, WILLIAM DE FORREST CROWELL, a citizen of the United States, residing at St. Louis, Missouri, have invented a certain new and useful Improvement in Clear-Vision Windshields, of which the following is a full, clear, and exact description, such as will enable others skilled in the art to which it appertains to make and use the same.

This invention relates to clear vision windshields of the type which are so constructed that a current of air will circulate upwardly across the clear vision slot of the shield, and thus prevent rain, dust, light snow and the like from blowing inwardly through said clear vision slot.

One object of my present invention is to provide a practicable three-piece wind shield of the type referred to which is of such design that it affords adequate protection for the occupants of the vehicle or conveyance on which it is used in inclement weather.

Another object is to provide a clear vision wind shield of the up-draft type, in which the various members of the shield can be easily adjusted so as to open and close the clear vision slot and to protect the upper part of the shield from the direct rays of the sun or from snow, rain and the like when the clear vision slot is not in use.

And still another object is to provide an efficient clear vision wind shield of simple construction, that is equipped with a member which is adapted to be adjusted in one position wherein it co-operates with the upper part of the shield to form a flue that induces a circulation of air upwardly across the clear vision slot of the shield and in a different position, wherein it serves as a sun shade or as a device of the kind commonly termed a rain vision device, which prevents rain, snow and the like from beating onto the upper part of the shield, when the clear vision slot is not in use. Other objects and desirable features of my invention will be hereinafter pointed out.

Figure 1 of the drawings is a diagrammatic view, illustrating a wind shield constructed in accordance with my invention and provided with a fixed or stationary bottom member that forms the lower part of the protecting wall of the shield.

Figure 2 is a diagrammatic view of the same shield, illustrating the parts or members of same in the position they occupy when the clear vision slot of the shield is in use.

Figure 3 is a diagrammatic view of a similar wind shield provided with a revoluble bottom member.

Figure 4 is a diagrammatic view of a wind shield embodying my invention but provided with a hinged lower member, showing the parts of the shield in the position they occupy when the clear vision slot is not in use; and Figure 5 is a diagrammatic view of the wind shield shown in Figure 4, illustrating the parts or members of the shield in the position they occupy when the clear vision slot is in use.

Referring to Figures 1 and 2 of the drawings, A designates a member preferably formed of glass or other suitable transparent material which forms the lower part of the shield, B designates a member preferably formed of glass or other suitable transparent material that forms the upper part of the shield, and C designates a member which may be formed either of opaque or transparent material. The members A and B are carried by a suitable supporting structure D which may comprise vertically-disposed side standards arranged at the ends of the members A and B, and the member C is preferably carried by arms 1 that project forwardly from the supporting structure D. I have not herein illustrated the details of construction of the members A, B and C, or the particular means that would be used in practice for connecting said members to the parts which carry them, as it is immaterial, so far as my broad idea is concerned, how said members are constructed or how they are mounted on the supporting structure, so long as the members B and C are capable of being adjusted in various positions, as hereinafter described. In practice each of the members A and B would consist of a sash or frame equipped with a sheet of glass, and the member C would either be of similar form or formed from a sheet of opaque material of sufficient strength and rigidity to permit it to be mounted on its supporting means.

The members A and B co-operate with each other to form the protecting wall of the shield, namely, a wall that serves as a closure for the front of the vehicle or conveyance on which the wind shield is used. The member A is stationary or rigidly mounted and the member B is adjustably mounted so that it can be arranged either in the position shown in Figure 1, wherein it co-operates with the member A to form a tight closure for the front of the vehicle, or in the position shown in Figure 2, wherein one of the longitudinal edges of said member B is spaced far enough away from the upper edge of the member A to form a clear vision slot X that affords an unobstructed view for the operator of the vehicle in inclement weather. When the member B is arranged in its closed position, as shown in Figure 1, or, in other words, when the clear vision slot of the shield is not in use, the member C is preferably arranged in the position shown in Figure 1, so as to protect the upper part B of the shield from the direct rays of the sun or from rain, snow and the like. I prefer to form the member C from opaque material so that it will serve as a sun shade when it is arranged in the position shown in Figure 1, but this is not essential, as the member C could be formed of transparent material, so that it would serve as a device of the type commonly known as a rain vision device, the function of which is to prevent rain, snow and the like from collecting on the upper part or half of a wind shield.

In inclement weather when the clear vision slot X of the shield is in use, as shown in Figure 2, the member C is arranged in the position shown in said figure, so that it will co-operate with the upper member B of the shield to form a flue which induces a circulation of air upwardly over the front side of the shield when the vehicle or conveyance on which the shield is used is traveling forwardly, the air being drawn upwardly into said flue by the suction which is created therein by the air rushing rearwardly over the top or roof E of the vehicle and past the ends of the members B and C, the air escaping over the top of the vehicle and at the sides of said flue. It is immaterial how the member C is mounted, so long as it can be arranged in a forwardly projecting position so as to protect the top member B when the clear vision slot is not in use, as shown in Figure 1, or in a position wherein it co-operates with the top member B to form a flue, as shown in Figure 2, when the clear vision slot is in use. I prefer, however, to mount the member C on the supporting arms 1 in such a manner that it can be moved from one position to another by revolving it about a horizontal axis extending longitudinally of the member C, as indicated by the dotted lines in Figure 2, this being accomplished by pivotally connecting the member C to the arms at points intermediate the longitudinal edges of said member, as indicated by the reference character 1ª.

In order to afford adequate protection for the occupants of the vehicle against rain, without resorting to a fourth member arranged at the rear of the portion A of the shield, I prefer to mount a gutter 2 on one edge of the upper member B so that when said upper member B is arranged in its open position, as shown in Figure 2, any rain that strikes the front side of same will drain downwardly to the gutter 2 and then laterally to the ends of the member B, where it can escape. The member B is preferably pivotally mounted at 3 at points intermediate the longitudinal edges of said member so that said member can be moved from its closed into its open position by revolving it in the manner indicated by the dotted lines in Figure 2, thus bringing the short edge of said member (the edge located nearest to the axis of rotation 3) to a point in proximity to the upper edge of the bottom member A but far enough above the upper edge of said member A to form the clear vision slot X. When the member B is arranged in its closed position, as shown in Figure 1, the gutter 2 on said member occupies a position at the upper edge of said member, in which position it will not obstruct the view of the operator or occupants of the vehicle. It may be swung inwardly for ventilation, as shown by dotted lines in Figure 1. The member C is also preferably provided with a gutter 4 arranged at the front edge of same so as to collect any rain that strikes said member and drains down the front side of same either when said member is adjusted in the position shown in Figure 2, wherein it serves as the front wall of the flue, or in the position shown in Figure 1, wherein it serves as a sun shade or rain vision device, depending upon the character of the material from which said member C is formed. If desired, the roof or top E of the vehicle may be provided at its front edge with a gutter, as indicated by the reference character 5, so as to prevent water from dripping down through the joint between the upper edge portion of the member B and the front edge of the top E against which the upper edge portion of the member bears when said member B is in its open position. A gutter 6 is preferably arranged at the lower edge of the bottom member A, so as to catch any water which might strike the inner side of the member A and drain down same. In some instances it may be preferable to revolubly mount the bottom member A' on the supporting structure and provide one of the longitudinal edges of said member with a lip or flange 7, as shown in Figure 3, so as to permit said member A' to be turned into the position shown in Figure 3, when the clear vision slot is in use, the lip 7 at the upper edge of said member operating to prevent any rain from being carried over the upper edge of the member A' by the upwardly flowing current of air.

If desired, closures 8 may be provided for the spaces between the side standards D and the ends of the lower member A so as to prevent rain, wind, dust and the like from beating inwardly around the ends of the member A, said closures preferably consisting of plates of glass so shaped that they completely close the spaces between the side standards D and the members A and B when said members A and B are in their closed position, as shown in Figure 1.

A wind shield of the construction above described affords a clear vision for the operator of the vehicle on which it is used and also adequate protection for the operator and occupants in inclement weather, due to the fact that the members A and B form a protecting wall of sufficient area to act as a closure for the front of the vehicle, and said members and the member C are so arranged with relation to each other that a current of air will circulate upwardly over the clear vision slot X in the protecting wall of the shield and thus prevent rain, dust, snow and the like from beating inwardly through said clear vision slot. The gutter 4 on the member C prevents rain that drains down the front side of said member from dripping from the lower edge of same and then being carried upwardly into the uptake flue by the current of air that circulates upwardly and laterally through said flue, and the gutter 2 on the member B prevents rain from dripping from the lower edge of said member and being blown inwardly into the vehicle. There is very little chance of rain collecting on the inside of the member A, but any rain that does collect on the inside of the member A drains downwardly to the gutter 6 located at the lower edge of the member A. Such a wind shield is of simple construction; it is of neat-and-ornamental design and it can be adjusted easily so as to form a complete closure for the front of the vehicle or to form a protecting wall provided with a clear vision slot of sufficient depth to afford a clear view for the operator.

In the form of my invention shown in Figures 4 and 5 the lower member A² of the shield is hinged or pivotally mounted at its lower edge and is so arranged with relation to the upper member B² that said members can be arranged in parallel relation, as shown in Figure 4, so as to form a tight closure for the front of the vehicle, said members being preferably so proportioned that the lower edge portion of the member B² laps over the upper edge portion of the member A². The lower member A² is adapted to be swung forwardly from its closed position shown in Figure 4 into its open position shown in Figure 5 and is held in its adjusted position, either closed or open, by a suitable securing means, such, for example, as a curved arm or arms 9 that project rearwardly from same through a guide or guides 10 on the supporting structure D equipped with a retaining device 11. In all other respects the wind shield shown in Figures 4 and 5 is substantially the same as the wind shield shown in Figures 1 and 2 and functions in the same manner. No side closures are necessary, however, in a wind shield of the kind shown in Figures 4 and 5, owing to the fact that the members A² and B² extend parallel to the side standards D when the clear vision slot is not in use.

Having thus described my invention, what I claim as new and desire to secure by Letters Patent, is:

1. A clear vision slot wind shield composed of two upper parts mounted so that they can be arranged in an upright position wherein they form the front and rear walls of an updraft flue open at its sides and upper end, or in a position wherein the front part constitutes a forwardly-inclined sunshade or rain visor that is disposed at an angle to said rear part, and a baffle constituting the lower part of the shield and adapted to be arranged in a forwardly-inclined position with its top edge positioned intermediate the bottom edges of said upper parts but below the same when said upper parts are being used to form an updraft flue.

2. A wind shield, comprising a lower part, a revolvably mounted upper part that is adapted to be turned upside-down so as to cause one of its longitudinal edges to be spaced far enough away from said lower part to form a clear vision slot, and an adjustable combined shade and flue member in front of said upper part that is adapted to be arranged in such a position that it projects forwardly from said upper part at a point above the lower edge of same.

3. A wind shield, comprising two upper parts that are adapted to be arranged in such a positon that they form an updraft flue open at its upper end and at its sides, and a forwardly inclined baffle constituting the lower part of the shield and arranged with its top edge spaced away from the bottom edge of the rear wall of said flue and at a point in advance of same.

4. A wind shield, comprising a lower part, a revolvably mounted upper part that is adapted to be turned upside-down so as to cause one of its longitudinal edges to be spaced far enough away from said lower part to form a clear vision slot, and a combination shade and flue member arranged in front of the upper part of the shield and pivotally mounted intermediate its top and bottom edges so that it can be swung from an inclined position wherein it serves as a shade into an upright position wherein it serves as a flue member.

5. A wind shield, comprising a supporting structure, a forwardly inclined bottom member carried by said supporting structure, an adjustable top member on said supporting structure adapted to be arranged in a position to co-operate with said bottom member to form a closed wall or in such a position that a clear vision slot is formed between said members, closures for the spaces between said supporting structure and the end portions of said members, and an adjustable part arranged in front of the top member of the shield and adapted to be arranged in one position wherein it co-operates with same to form an updraft flue or in a different position wherein it projects forwardly from said top member.

WILLIAM DE FORREST CROWELL.